United States Patent
Peer et al.

(10) Patent No.: US 6,637,769 B2
(45) Date of Patent: Oct. 28, 2003

(54) INFLATABLE CURTAIN WITH ANCHOR DEVICE

(75) Inventors: Thomas L. Peer, Marysville, MI (US); William P. Braun, Romeo, MI (US); Thomas Osentoski, Marysville, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/267,460

(22) Filed: Oct. 9, 2002

(65) Prior Publication Data

US 2003/0052478 A1 Mar. 20, 2003

Related U.S. Application Data

(62) Division of application No. 09/779,002, filed on Feb. 7, 2001, now Pat. No. 6,474,681.

(51) Int. Cl.⁷ .............................................. B60R 21/22
(52) U.S. Cl. .................................. 280/730.2; 280/743.2
(58) Field of Search .......................... 280/730.2, 730.1, 280/749, 753, 743.2

(56) References Cited

U.S. PATENT DOCUMENTS

| | | |
|---|---|---|
| 3,687,485 A | 8/1972 | Campbell |
| 5,265,903 A | 11/1993 | Kuretake et al. |
| 5,333,898 A | 8/1994 | Stutz |
| 5,462,308 A | 10/1995 | Seki et al. |
| 5,588,672 A | 12/1996 | Karlow et al. |
| 5,660,414 A | 8/1997 | Karlow et al. |
| 5,707,075 A | 1/1998 | Kraft et al. |
| 5,788,270 A | 8/1998 | Haland et al. |
| 5,865,462 A | 2/1999 | Robins et al. |
| 6,073,961 A | 6/2000 | Bailey et al. |
| 6,237,938 B1 | 5/2001 | Boxey |
| 6,237,943 B1 | 5/2001 | Brown et al. |
| 6,273,458 B1 | 8/2001 | Steffens, Jr. et al. |
| 6,454,296 B1 * | 9/2002 | Tesch et al. ............. 280/730.2 |

FOREIGN PATENT DOCUMENTS

JP          9-249089          9/1997

* cited by examiner

*Primary Examiner*—Peter C. English
(74) *Attorney, Agent, or Firm*—Tarolli, Sundheim, Covell & Tummino L.L.P.

(57) ABSTRACT

An apparatus (10) comprises an inflatable vehicle occupant protection device (14) inflatable in a first direction away from a vehicle roof (18) into a position between a side structure (16) of the vehicle (12) and a vehicle occupant. An elongated member (70) is connected to the side structure (16) and has a first end (72), an opposite second end (76) and a length measured between the first and second ends. An element (100) is connected to the protection device (14) and at least partially encircles the elongated member (70). The element (100) is slidable along the elongated member (70) in the first direction when the protection device (14) is inflated. The element (100) includes at least one portion (150, 212) that engages the elongated member (70) and blocks the element from sliding along the elongated member in a direction opposite the first direction.

18 Claims, 7 Drawing Sheets

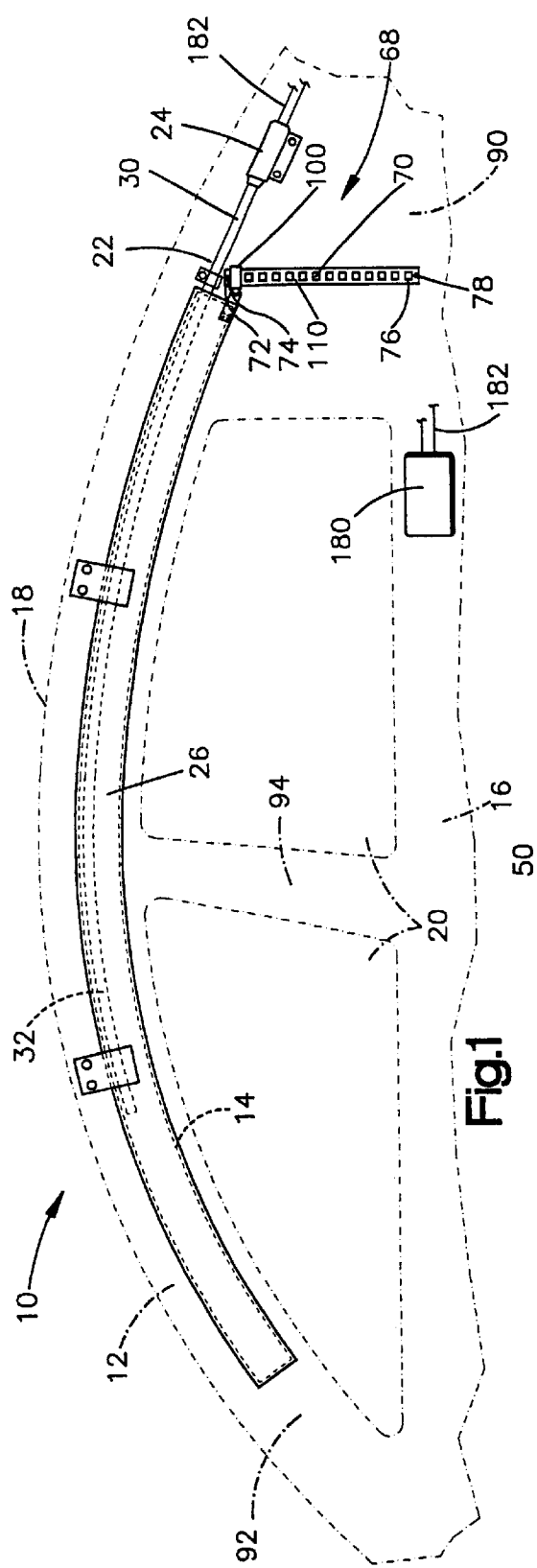
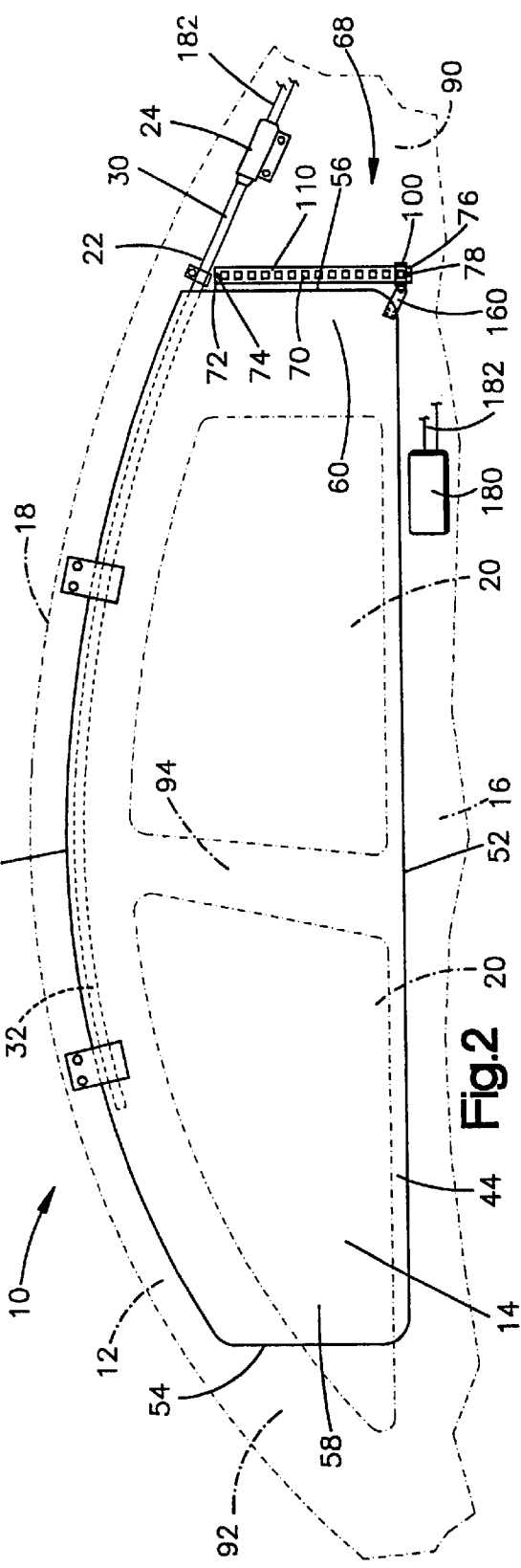

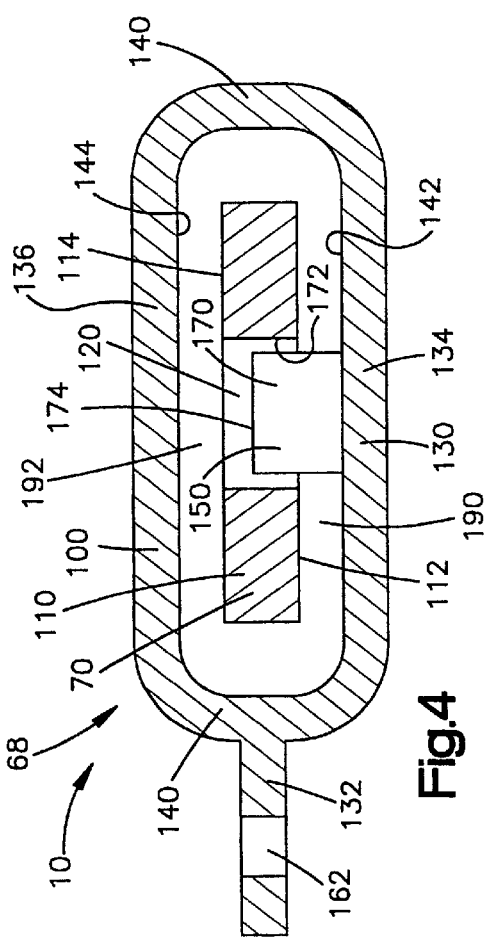
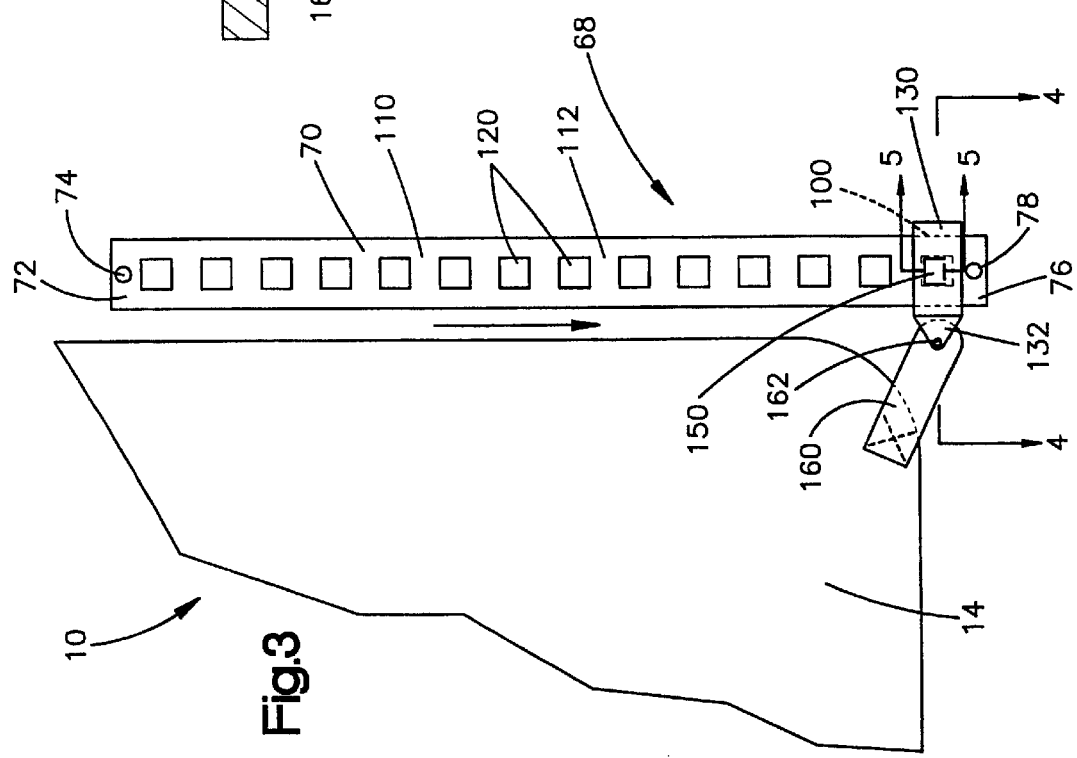

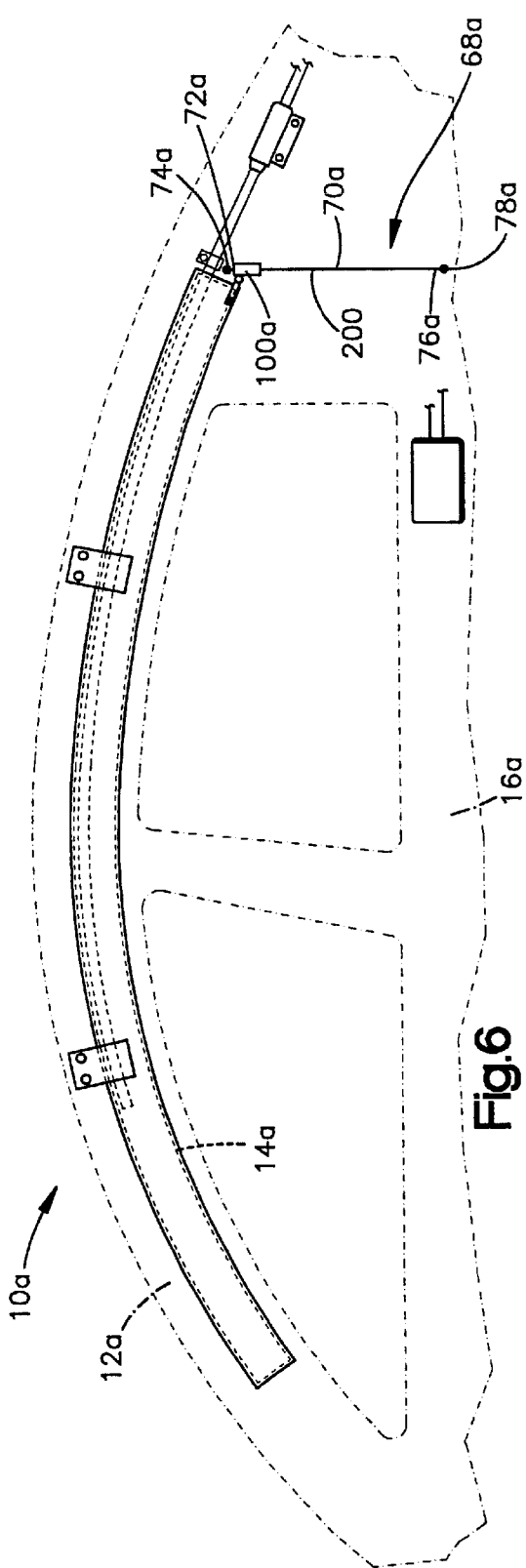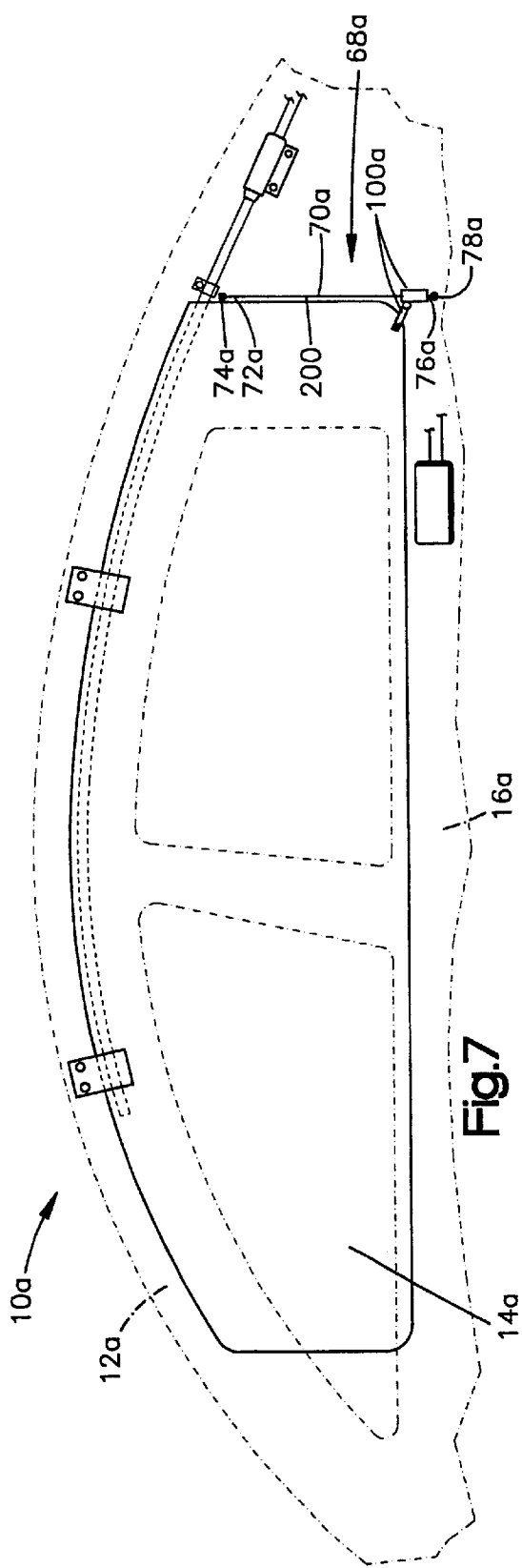

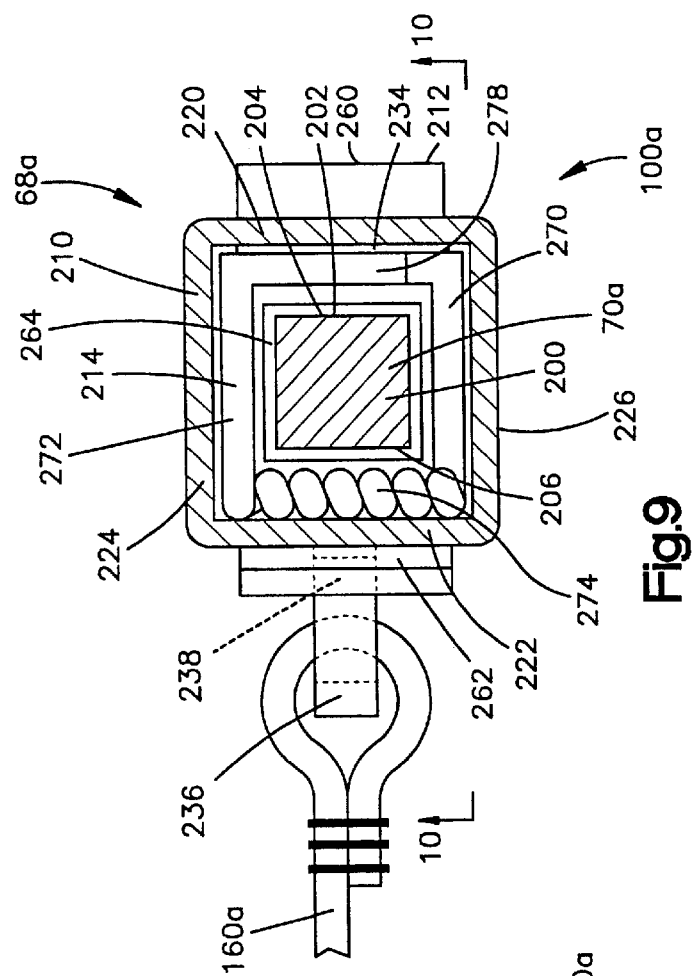
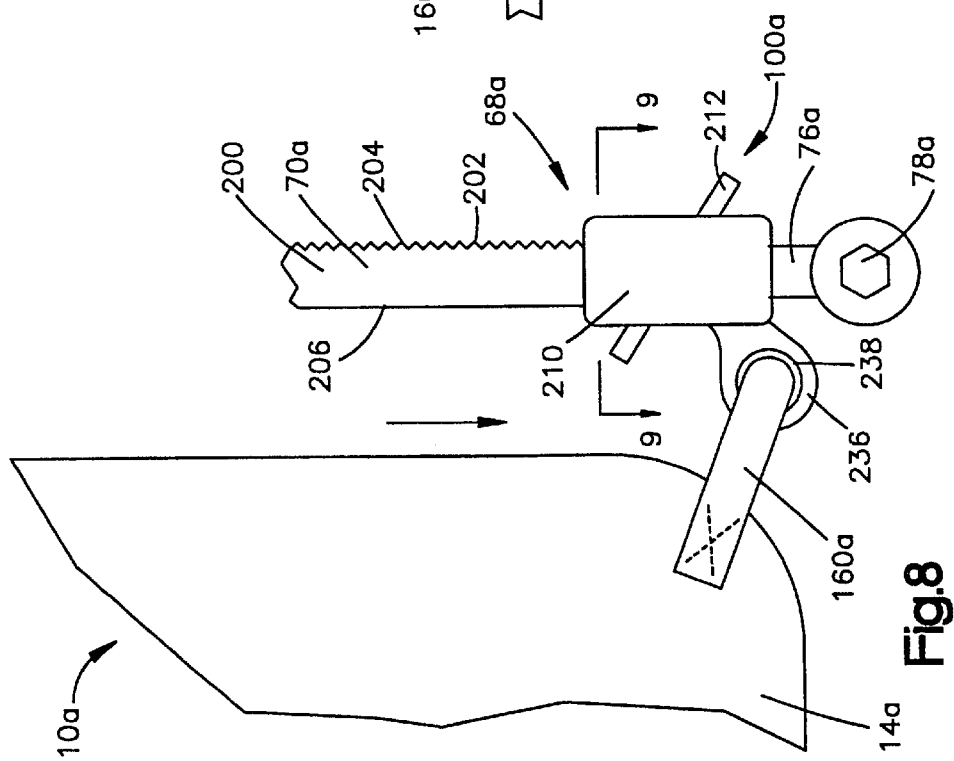

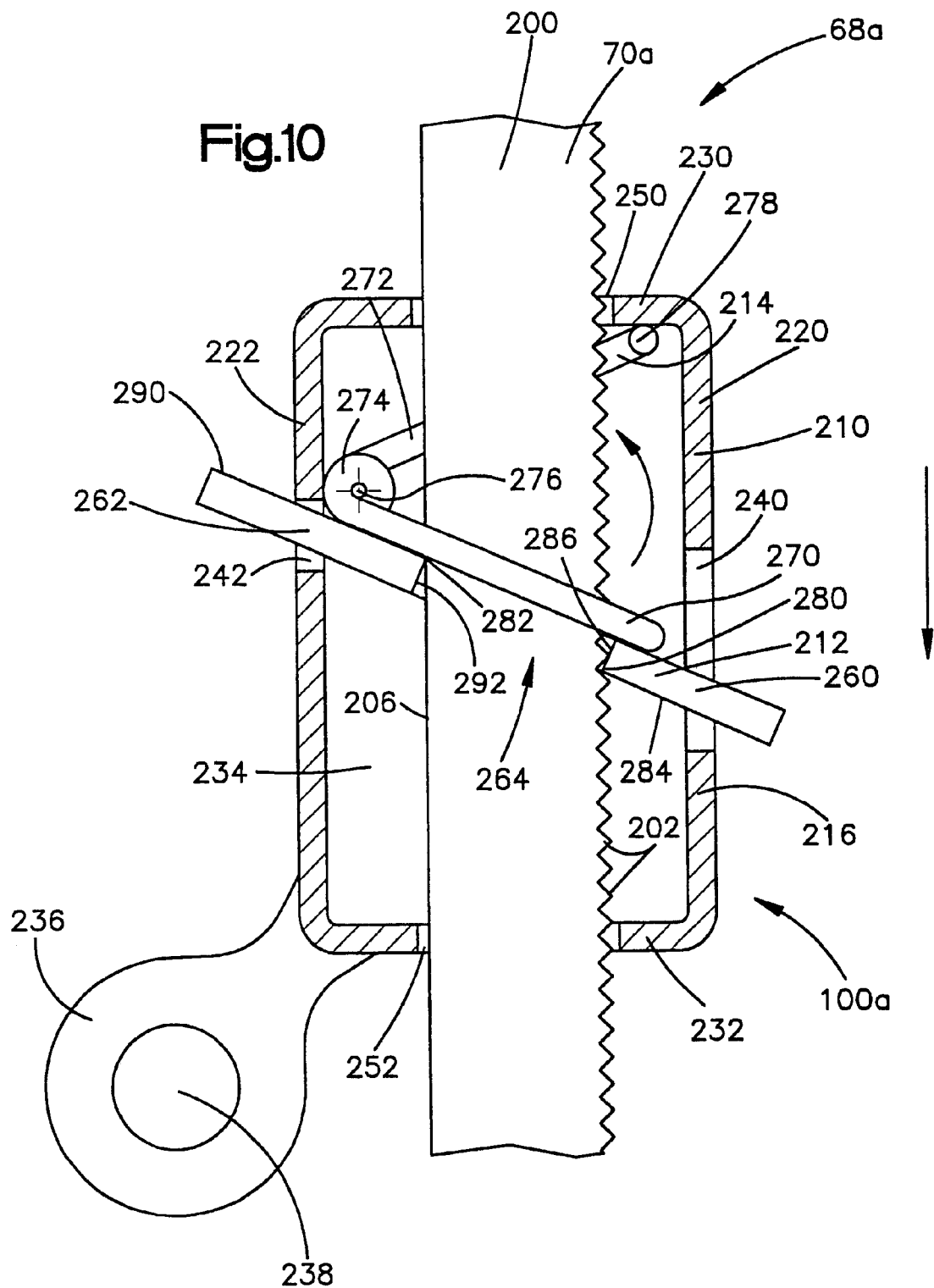

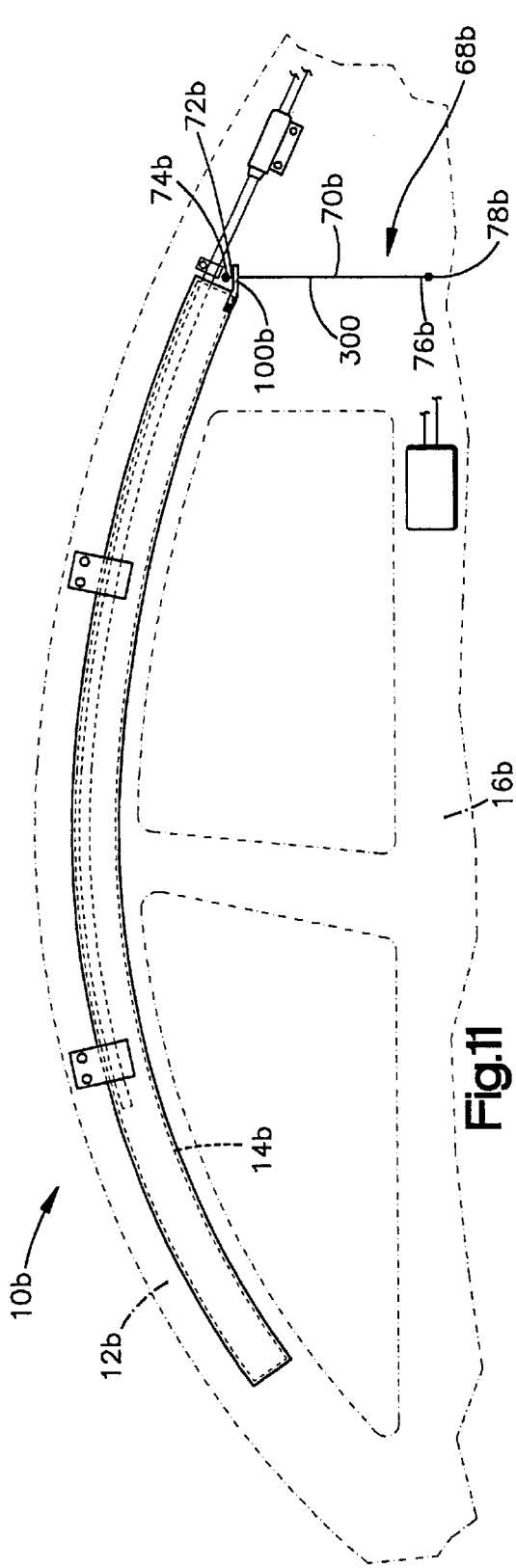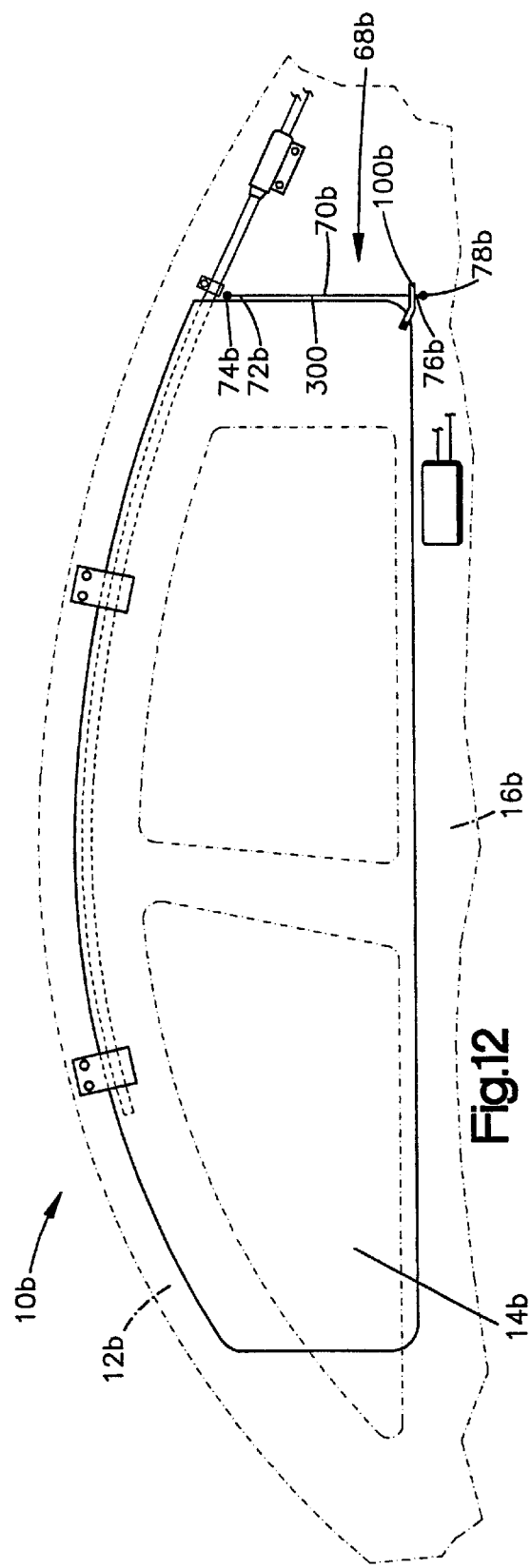

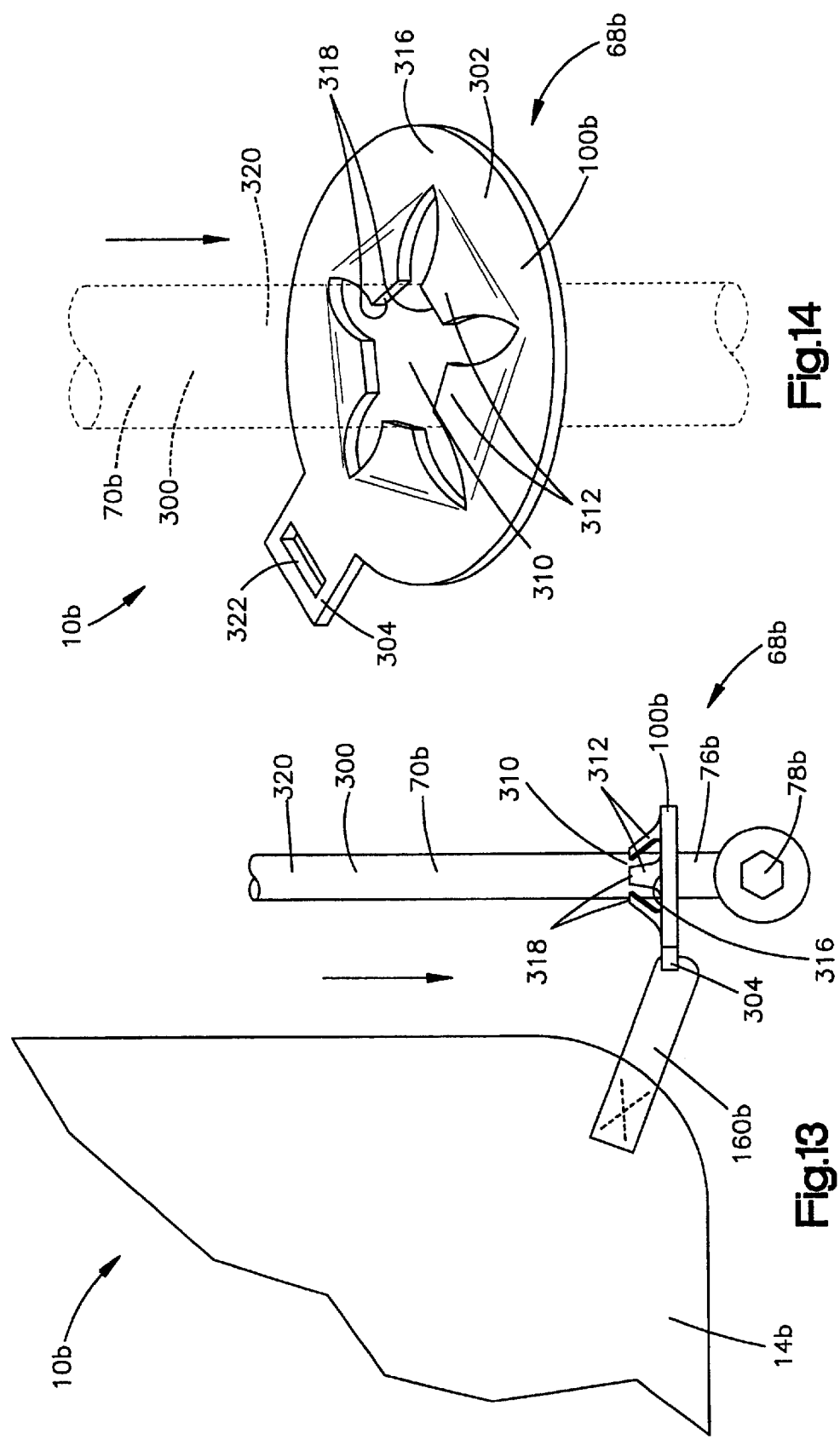

INFLATABLE CURTAIN WITH ANCHOR DEVICE

RELATED APPLICATION

This application is a division of U.S. patent application Ser. No. 09/779,002, filed Feb. 7, 2001, now U.S. Pat. No. 6,474,681.

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable in a first direction away from the vehicle roof into a position between the side structure of the vehicle and a vehicle occupant. An inflation fluid source provides inflation fluid for inflating the protection device. An elongated member is connected to the side structure and has a first end, an opposite second end and a length measured between the first and second ends. An element is connected to the protection device and at least partially encircles the elongated member along a portion of the length of the elongated member. The element is slidable along the elongated member in the first direction when the protection device is inflated. The element includes at least one portion that engages the elongated member and blocks the element from sliding along the elongated member in a direction opposite the first direction.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view depicting a deflated condition of an apparatus for helping to protect an occupant of a vehicle, according to a first embodiment of the present invention;

FIG. 2 is a schematic view of the apparatus of FIG. 1 in an inflated condition;

FIG. 3 is an enlarged view of a portion of the apparatus of FIG. 2;

FIG. 4 is an enlarged sectional view of a portion of the apparatus, taken generally along line 4—4 of FIG. 3;

FIG. 5 is an enlarged sectional view of a portion of the apparatus, taken generally along line 5—5 of FIG. 3;

FIG. 6 is a schematic view depicting a deflated condition of an apparatus for helping to protect an occupant of a vehicle, according to a second embodiment of the present invention;

FIG. 7 is a schematic view of the apparatus of FIG. 6 in an inflated condition;

FIG. 8 is an enlarged view of a portion of the apparatus of FIG. 7;

FIG. 9 is a sectional view taken generally along line 9—9 in FIG. 8;

FIG. 10 is a sectional view taken generally along line 10—10 in FIG. 9;

FIG. 11 is a schematic view depicting a deflated condition of an apparatus for helping to protect an occupant of a vehicle, according to a third embodiment of the present invention;

FIG. 12 is a schematic view of the apparatus of FIG. 11 in an inflated condition;

FIG. 13 is an enlarged view of a portion of the apparatus of FIG. 12; and

FIG. 14 is a perspective view of a portion of the apparatus of FIG. 13.

DESCRIPTION OF THE PREFERRED EMBODIMENTS

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24 and a second end portion 32 positioned in the inflatable curtain 14. The fill tube 22 has a plurality of openings (not shown) that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20.

The inflatable curtain 14 preferably comprises overlying panels that are woven together along a perimeter 44 (FIG. 2) of the curtain to define an inflatable volume. The perimeter 44 is defined at least partially by an upper edge 50 of the inflatable curtain 14, an opposite lower edge 52 of the curtain, and front and rear edges 54 and 56, respectively, of the curtain that are spaced apart horizontally along the upper and lower edges.

The front and rear edges 54 and 56 of the inflatable curtain 14 partially define front and rear portions 58 and 60, respectively, that are spaced apart horizontally along the upper and lower edges 50 and 52 and extend between the upper and lower edges. In the embodiment illustrated in FIG. 2, the front and rear edges 54 and 56 extend between the upper and lower edges 50 and 52. The front and rear edges 54 and 56 could, however, be omitted and the upper and lower edges 50 and 52 extended until they intersect, in which case the front and rear portions 58 and 60 would be defined by the intersecting upper and lower edges.

Preferably, the inflatable curtain 14 is woven as a single piece of material to form the overlying panels. It will be recognized by those skilled in the art, however, that the inflatable curtain 14 could have alternative constructions. For example, the overlying panels could be formed from a sheet of material that is folded over and secured along a portion of the perimeter 44 by means, such as stitching, to form the inflatable curtain 14. The panels could also be formed from separate sheets of material arranged in an overlying manner and secured together along the entire perimeter 44 of the panels to form the inflatable curtain 14.

The inflatable curtain is preferably constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction. The materials used to construct the inflatable curtain 14 may also be single or multi-layered materials.

The apparatus 10 (FIGS. 1 and 2) includes an anchor device 68 that comprises an elongated member 70 connected to the vehicle side structure 16 and an element 100 that is slidable along the elongated member. The elongated member 70 has a first end 72 connected to the vehicle 12 at a first location 74 on the side structure 16, and an opposite second end 76 connected to the vehicle at a second location 78 on the side structure. The first and second locations 74 and 78 may be on or near a C pillar 90 of the vehicle 12. The elongated member 70 is oriented generally vertically in the vehicle 12. The elongated member 70 may, however, be positioned at a desired angle relative to the vehicle 12.

The element 100 encircles the elongated member 70 along a portion of the length of the elongated member. The element 100 is connected to the inflatable curtain 14. Preferably, the element 100 is connected to the inflatable curtain 14 at a position adjacent the lower edge 52 of the curtain. As illustrated in FIG. 2, the element 100 may be connected to the inflatable curtain 14 in the rear portion 60 of the curtain, near the intersection of the lower edge 52 and the rear edge 56 of the curtain.

According to the first embodiment of the present invention, the elongated member 70 comprises an elongated bar 110. The configuration of the bar 110 is best illustrated in FIGS. 3–5. The bar 110 is preferably constructed of a single piece of metal material. The bar 110 could, however, have alternative material constructions. For example, the bar 110 could be constructed of plastic by known means, such as molding.

As illustrated in FIG. 4, the bar 110 has a generally rectangular cross-section. The bar 110 has a width measured along the longer of the rectangular dimensions and a thickness measured perpendicular to the width along the shorter of the rectangular dimensions. The bar 110 includes a first surface 112 and an opposite second surface 114. The first and second surfaces 112 and 114 extend across the width of the bar 110, along the length of the bar.

The bar 110 includes a plurality of apertures 120 (FIGS. 3–5) that extend through the bar from the first surface 112 to the second surface 114. As illustrated in FIG. 3, the apertures 120 have a generally rectangular shape. The apertures 120 could, however, have any suitable shape. The apertures 120 are formed in the bar 110 by any suitable method. For example, if the bar 110 has a metal construction, the apertures 120 could be stamped in the bar. If the bar 110 has a plastic construction, the apertures 120 could be molded in the bar.

As illustrated in FIG. 4, the element 100 has a body portion 130 and a flange portion 132. The body portion 130 is generally tubular and has a generally rectangular cross-section. The body portion 130 surrounds the bar 110 along a portion of the length of the bar. The body portion 130 includes a first side 134 that extends adjacent the first surface 112 of the bar 110, a second side 136 that extends adjacent the second surface 114 of the bar, and opposite end portions 140 that extend between the first and second sides 134 and 136.

The first side 134 of the body portion 130 includes a first inner surface 142 that overlies the first surface 112 of the bar 110. The second side 136 of the body portion 130 includes a second inner surface 144 that overlies the second surface 114 of the bar 110. The flange portion 132 extends in a generally perpendicular direction from one of the end portions 140 of the body portion 130.

As best illustrated in FIGS. 4 and 5, the element 100 includes a latch 150 that extends away from the first inner surface 142 at an acute angle towards the second inner surface 144 and towards the bar 110. The latch 150 comprises a portion of the first side 134 of the body portion 130 of the element 100 that is bent inward towards the bar 110. Those skilled in the art, however, will recognize that the latch 150 may comprise a separate piece of material connected to the first inner surface 142 of the body portion 130. In such an instance, the latch 150 would be connected to the first inner surface 142 by means such as welding, fasteners or adhesives.

The inflatable curtain 14 is connected to the flange portion 132 of the element 100. In the embodiment illustrated in FIG. 3, a flexible elongated member 160, such as a tether, connects the inflatable curtain 14 to the flange portion 132. The inflatable curtain 14 could, however, be connected directly to the flange portion 132. The flange portion 132 (FIGS. 3 and 4) includes an aperture 162 that extends through the flange portion and facilitates connecting the inflatable curtain 14 (FIG. 3) to the element 100.

The vehicle 12 includes a sensor mechanism 180 (shown schematically in FIGS. 1 and 2) for sensing a side impact to the vehicle 12 and/or a rollover of the vehicle 12. The sensor mechanism 180 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 180 provides an electrical signal over lead wires 182 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 (FIG. 2) inflates under the pressure of the inflation fluid from the inflator 24. The housing 26 opens and the inflatable curtain 14 inflates in a first direction away from the vehicle roof 18, downward as shown in the drawings and in a downward direction with respect to the direction of forward travel of the vehicle 12.

The inflatable curtain 14, when inflated, extends along the side structure 16 of the vehicle 12 and is positioned between the side structure and any occupant of the vehicle. The inflated curtain 14 extends between an A pillar 92 and the C pillar 90 of the vehicle 12 and overlies at least a portion of the A pillar, C pillar, and a B pillar 94 of the vehicle.

It will be recognized by those skilled in the art that the inflatable curtain 14 may have alternative configurations. For example, in the illustrated embodiment, the inflatable curtain 14 extends between the A pillar 92 and the C pillar 90 of the vehicle 12. The inflatable curtain 14 could, however, extend between the A pillar 92 and the B pillar 94 only or between the B pillar and the C pillar 90 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When inflated, the inflatable curtain 14 helps to absorb the energy of impacts with the curtain and helps to distribute the impact energy over a large area of the curtain.

As the inflatable curtain 14 inflates, the curtain pulls on the element 100 in the first direction via the tether 160. The first direction is indicated generally by the arrow in FIGS. 3 and 5. The inflating curtain 14 (FIG. 3) causes the element 100 to slide in the first direction along the bar 110, from the first end 72 towards the second end 76.

As illustrated in FIGS. 4 and 5, there is a gap 190 between the first inner surface 142 of the element 100 and the first surface 112 of the bar 110. There is also a gap 192 between the second inner surface 144 of the element 100 and the second surface 114 of the bar 110. The gaps 190 and 192 are just large enough to allow the latch 150 to slide on the first surface 112 of the bar 110 between the apertures 120. As the element 100 slides along the bar 110 in the first direction, the latch 150 moves into the apertures 120.

The anchor device 68 (FIG. 3) is constructed such that the element 100 is permitted to move along the bar 110 in the first direction, and is blocked from moving in a direction opposite the first direction. As the element 100 slides along the bar 110 in the first direction, the latch 150 slides along the first surface 112 of the bar. When the latch 150 reaches an aperture, the latch 150 moves into the aperture as shown in FIGS. 4 and 5.

As the latch 150 continues to move in the first direction, an upper surface 170 of the latch engages the bar 110 on a side wall 172 that defines the aperture, adjacent the intersection of the first surface 112 of the bar 110 and the side wall 172. The upper surface 170 of the latch 150 is positioned at an acute angle relative to the side wall 172, which urges the latch to move out of the aperture 120 as the element 100 moves in the first direction. If the element 100 moves in a direction opposite the first direction, an end portion 174 of the latch 150 engages the side wall 172 of the aperture 120, which blocks movement of the element in the direction opposite the first direction.

The apertures 120 (FIG. 3) provide various positions along the length of the bar 110 where the element 100 is blocked from moving in a direction opposite the first direction. Thus, as the element 100 slides in the first direction along the bar 110, it is blocked from moving in the direction opposite the first direction at the aperture reached by the element that is farthest from the first end 72 of the bar 110.

When the inflatable curtain 14 is in the inflated condition of FIG. 2, the anchor device 68 helps maintain the position of the curtain between any occupant of the vehicle 12 and the side structure 16 of the vehicle throughout the duration of the vehicle collision and/or rollover. The anchor device 68 also helps limit movement of the inflatable curtain 14 in a direction opposite the first direction.

Advantageously, the construction of the anchor device 68 in the embodiment illustrated in FIGS. 1–5 is not dependent on the side of the vehicle, i.e. the driver side or passenger side, on which the device is mounted. For example, as best illustrated in FIG. 4, one anchor device 68 may be mounted on one side of a vehicle (not shown in FIG. 4) with the first side 134 of the body portion 130 adjacent the vehicle. An identical anchor device 68 could be mounted on the opposite side of the vehicle with the second side 136 of the body portion 130 adjacent the vehicle. In both cases, the flange portion 132 would extend in the same direction. Also, the element 100 may be slid off the bar 110, rotated 180 degrees relative to the length of the bar, and slid back onto the bar in order to position the flange portion 132 in an opposite direction.

Those skilled in the art will recognize that the embodiment illustrated in FIGS. 1–5 may have varying constructions without departing from the spirit of the invention. For example, element 100 need not completely encircle the bar 110. Also, the bar 110 need not be attached to the vehicle 12 at its ends.

A second embodiment of the present invention is illustrated in FIGS. 6–10. The second embodiment of the invention is similar to the first embodiment of the invention illustrated in FIGS. 1–5. Accordingly, numerals similar to those of FIGS. 1–5 will be utilized in FIGS. 6–10 to identify similar components, the suffix letter "a" being associated with the numerals of FIGS. 6–10 to avoid confusion. The apparatus 10a (FIGS. 6–10) of the second embodiment is identical to the apparatus 10 (FIGS. 1–5), except that the elongated member 70a and the element 10a of the anchor device 68a (FIGS. 6–10) in the second embodiment have different configurations than the elongated member 70 and the element 100 (FIGS. 1–5) of the first embodiment.

The elongated member 70a of the second embodiment has a first end 72a connected to the vehicle 12a at a first location 74a and an opposite second end 76a connected to the vehicle at a second location 78a. The element 10a encircles the elongated member 70a along a portion of the length of the elongated member. The element 100a is connected to the inflatable curtain 14a.

As illustrated in FIGS. 8–10, the elongated member 70a of the second embodiment comprises an elongated bar 200. The bar 200 has a generally rectangular cross-section (FIG. 9) and includes opposite first and second surfaces 204 and 206 extending along the length of the bar. The bar 200 could, however, have an alternative cross-sectional shape, such as a circular cross-section. The bar 200 also includes a plurality of teeth 202 (FIGS. 8–10) positioned along the first surface 204 of the bar.

The element 100a comprises a housing 210, a latch 212 that extends through the housing, and a spring 214 (FIGS. 9 and 10) that is disposed in the housing. The housing 210 includes a main portion 216 that has a generally box-like configuration. As viewed in FIGS. 9 and 10, the main portion 216 includes spaced, parallel first and second side walls 220 and 222, and spaced, parallel third and fourth side walls 224 and 226 (FIG. 9) that extend between the first and second side walls. First and second end walls 230 and 232 (FIG. 10) extend between the first and second side walls 220 and 222 and the third and fourth side walls 224 and 226 at opposite ends of the side walls. The side walls 220, 222, 224, 226, and end walls 230 and 232 help define a hollow interior 234 (FIGS. 9 and 10) of the housing 210.

The housing 210 (FIGS. 8–10) also includes an eyelet 236 that extends at an angle from the main portion 216 of the housing 210 at a location adjacent the intersection of the second side wall 222 and the second end wall 232. The eyelet 236 includes an aperture 238 for receiving the tether 160a, which connects the inflatable curtain 14a (FIG. 8) to the element 100a. It will be recognized by those skilled in the art, however, that the tether 160a could be omitted and the element 100a could be connected directly to the inflatable curtain 14a. For example, the element 100a could be connected directly to the inflatable curtain 14a by means, such as stitching or rivets, that passes through the aperture 238 to connect the element to the inflatable curtain.

A rectangular first opening 240 (FIG. 10) extends through the first side wall 220 of the housing 210. A rectangular second opening 242 extends through the second side wall 222 of the housing 210 and is located in a generally offset position with respect to the first opening. The second opening 242 has a height, measured vertically as viewed in FIG. 10, that is smaller than the height of the first opening 240.

A rectangular third opening 250 extends through the first end wall 230 of the housing 210. A rectangular fourth opening 252 extends through the second end wall 232 of the housing 210. The third and fourth openings 250 and 252 are generally equal in size and are aligned relative to each other at opposite ends of the housing 210.

The latch 212 extends through the main portion 216 of the housing 210. The latch 212 extends through the first opening 240 in the first side wall 220, through the interior 234 of the housing 210, and through the second opening 242 in the second side wall 222. A first end portion 260 of the latch 212 protrudes from the main portion 216 through the first opening 240. A second end portion 262 of the latch 212, opposite the first end portion 260, protrudes from the main portion 216 through the second opening 242.

The latch 212 includes a generally rectangular latch aperture 264 that extends through the latch 212 between the first and second end portions 260 and 262 of the latch. When the latch 212 is positioned extending through the main portion 216 of the housing 210, as illustrated in FIG. 10, the latch aperture 264 is disposed in the interior 234 of the housing and is aligned generally with the third and fourth openings 250 and 252.

Referring to FIGS. 9 and 10, the spring 214 includes a first biasing member 270, a second biasing member 272, and a coil portion 274. The coil portion 274 is centered on an axis 276 about which the first and second biasing members 270 and 272 may pivot. The coil portion 274 is positioned on the second side wall 222 of the housing 210 and extends from adjacent the third side wall 224 to adjacent the fourth side wall 226.

The first biasing member 270 is positioned adjacent the fourth side wall 226. The first biasing member 270 extends from the coil portion 274 at an acute angle towards the first side wall 220 and towards the second end wall 232. The second biasing member 272 is positioned adjacent the third side wall 224. The second biasing member 272 extends from the coil portion 274 at an acute angle towards the first side wall 220 and towards the first end wall 230.

The first biasing member 270 is positioned adjacent to and in abutting engagement with the latch 212 and extends generally parallel to the latch. The second biasing member 272 has an end portion 278 that engages the first end wall 230 at a position near the intersection of the first end wall and the first side wall 220.

The bar 200 extends through the third opening 250 in the first end wall 230, through the interior 234 of the housing 210, and through the fourth opening 252 in the second end wall 232. In the interior 234 of the housing 210, the bar 200 extends through the latch aperture 264 in a direction transverse to the length of the latch and passes between the first and second biasing members 270 and 272 of the spring 214.

The first and second biasing members 270 and 272 are biased against the latch 212 and the first end wall 230, respectively, under the spring bias of the coil portion 274. The latch 212 is movable with the first biasing member 270 as the first biasing member pivots about the axis 276 under the bias of the spring 214. The spring 214 thus biases the latch 212 against the bar 200.

The spring 214 illustrated in FIGS. 8–10 is illustrative of only one particular spring suitable for use in the element 100a. Those skilled in the art will recognize that the spring 214 may be one of a variety of alternative designs. For example, the spring 214 may comprise a coil spring, torsion spring, or leaf spring.

The size of the second opening 242 is sufficient to allow the latch 212 to pivot in the housing 210. The latch 212 pivots in the housing 210 generally about the second end portion 262. The size of the first opening 240 is sufficient to allow the first end portion 260 to move in the first opening as the latch pivots in the housing 210. The first opening 240 and/or the second opening 242 help limit the angular distance that the latch 212 may pivot in the housing 210.

The latch 212 includes a first edge 280 that is defined by the intersection of a first surface 284 of the latch 212 and a first side wall 286 that defines the latch aperture 264. The latch 212 also includes a second edge 282 that is defined by the intersection of a second surface 290 of the latch 212, opposite the first surface 284, and a second side wall 292 that defines the latch aperture 264 and that is spaced opposite the first side wall 286. When the latch 212 is biased against the bar 200, the first and second edges 280 and 282 are biased against the first and second surfaces 204 and 206, respectively, of the bar. The first edge 280 is biased into engagement with the teeth 202 on the first surface 204 and the second edge 282 is biased into engagement with the generally smooth second surface 206.

As the inflatable curtain 14a (FIG. 8) inflates, the curtain pulls the element 100a in the first direction. The first direction is indicated generally by the arrow in FIGS. 8 and 10. The inflating curtain 14a (FIG. 8) causes the element 100a to slide along the bar 200 in the first direction.

The anchor device 68a is constructed such that the element 100a is permitted to move along the bar 200 in the first direction, and is blocked from moving in a direction opposite the first direction. As the element 100a slides along the bar 200 in the first direction, the latch 212 is urged to pivot against the bias of the spring 214 in a counterclockwise direction as viewed in FIG. 10. The counterclockwise direction is indicated generally by the curved arrow in FIG. 10.

When the latch 212 pivots against the bias of the spring 214, the biasing of the first and second edges 280 and 282 against the first and second surfaces 204 and 206 is reduced or removed. This causes the first edge 280 to disengage from the teeth 202 and reduces friction between the latch 212 and the bar 200. As a result, the element 100a is permitted to slide along the bar 200 when the inflatable curtain 14a pulls the element in the first direction.

When a force acting on the element 100a urges the element in a direction opposite the first direction, the latch 212 is urged to pivot in the same direction that the spring 214 biases the latch, i.e. in a direction opposite the curved arrow in FIG. 10. This causes the first and second edges 280 and 282 to be urged towards the first and second surfaces 204 and 206 of the bar 200. The first edge 280 is biased into engagement with the teeth 202 on the first surface 204 and the second edge 282 is biased into engagement with the second surface 206. The engagement of the first edge 280 with the teeth 202 and friction between the latch 212 and the bar 200 help block movement of the element 100a along the bar in the direction opposite the first direction.

As the force urging the element 100a in the direction opposite the first direction increases, the degree to which the first and second edges 280 and 282 are urged towards the first and second surfaces 204 and 206 increases. This increases the amount of force urging the first edge 280 into engagement with the teeth 202 and the amount of force urging the second edge 282 into engagement with the second surface 206. These increased forces help to increase the degree to which the element 100a is blocked from movement in the direction opposite the first direction.

Those skilled in the art will recognize that the anchor device 68a may not include teeth 202 on the first surface 204 of the bar 200. In such an instance, the first and second edges 280 and 282 of the latch 212 would deform and dig into the first and second surfaces 204 and 206 of the bar 200 under the bias of the spring 214 and the force caused by movement of the element 100a in the direction opposite the first direction.

Those skilled in the art will also recognize that, because the edges 280 and 282 of the latch 212 may cause material deformation of the first and second surfaces 204 and 206 of the bar 200, the materials selected to construct the bar 200 and the latch 212 may affect the operation of the anchor device 68a. For example, the bar 200 may be constructed of metal, in which case the latch 212 would be constructed of a metal or other material having a hardness greater than that of the bar. As an alternative, the bar 200 could be made of plastic or have an elastomeric coating, which would increase the ability of the latch 212 to cause material deformation in the first and second surfaces 204 and 206.

As the element 100a (FIGS. 6 and 7) slides downward in the first direction along the bar 200, it is blocked from moving in the direction opposite the first direction at the farthest position from the first end 72a that the element reaches. When the inflatable curtain 14a is in the inflated condition, the element 100a and the bar 200 help maintain the position of the curtain between any occupant of the vehicle 12a and the side structure 16a of the vehicle throughout the duration of the vehicle collision and/or rollover. The element 100a and the bar 200 also help limit movement of the inflatable curtain 14a in a direction opposite the first direction.

The construction of the anchor device 68a in the embodiment illustrated in FIGS. 6–10 is not dependent on the side of the vehicle on which the device is mounted. The anchor device 68a can be mounted on either side of the vehicle 12a, and the element 100a may be rotated or flipped such that the eyelet 236 extends in a desired direction.

A third embodiment of the present invention is illustrated in FIGS. 11–14. The third embodiment of the invention is similar to the first embodiment of the invention illustrated in FIGS. 1–5. Accordingly, numerals similar to those of FIGS. 1–5 will be utilized in FIGS. 11–14 to identify similar components, the suffix letter "b" being associated with the numerals of FIGS. 11–14 to avoid confusion. The apparatus 10b (FIGS. 11–14) of the third embodiment is identical to the apparatus 10 (FIGS. 1–5), except that the elongated member 70b and the element 100b of the anchor device 68b (FIGS. 11–14) in the third embodiment have different configurations than the elongated member 70 and the element 100 (FIGS. 1–5) of the first embodiment.

The elongated member 70b of the second embodiment has a first end 72b connected to the vehicle 12b at a first location 74b and an opposite second end 76b connected to the vehicle at a second location 78b. The element 100b encircles the elongated member 70b along a portion of the length of the elongated member. The element 100b is connected to the inflatable curtain 14b.

As illustrated in FIGS. 13 and 14, the elongated member 70b of the third embodiment comprises an elongated cylindrical member 300. The element 100b includes a ring-shaped body portion 302 and a flange portion 304 that extends from the body portion. An aperture 310 extends through the body portion 302. The elongated cylindrical member 300 extends through the aperture 310.

The element 100b includes a plurality of petals 312 that are positioned radially around the aperture 310 and extend from an upper surface 316 of the body portion 302 at an acute angle towards the elongated cylindrical member 300. The petals 312 are biased against the elongated cylindrical member 300 by the resilient characteristics of the material, preferably metal, used to construct the element 100b. Edge portions 318 of the petals 312 are in continuous engagement with a cylindrical outer surface 320 of the elongated cylindrical member 300.

The flange portion 304 of the element 100b includes an aperture 322 (FIG. 14) that extends through the flange portion. As illustrated in FIG. 13, the inflatable curtain 14b is connected to the element 100b via a tether 160b that extends through the aperture 322 in the flange portion 304. It will be recognized by those skilled in the art, however, that the tether 160b could be omitted and the element 100b could be connected directly to the inflatable curtain 14b. For example, the flange portion 304 could be omitted and the body portion 302 could include eyelets. The element 100b could then be connected directly to the inflatable curtain 14b by means, such as stitching or rivets, that pass through the eyelets.

As the inflatable curtain 14b (FIG. 11) inflates, the curtain pulls the element 100b in the first direction. The first direction is indicated generally by the arrow in FIGS. 13 and 14. The inflating curtain 14b (FIG. 11) causes the element 100b to slide along the elongated cylindrical member 300 in the first direction.

The anchor device 68b is constructed such that the element 100b is permitted to move along the elongated cylindrical member 300 in the first direction, and is blocked from moving in a direction opposite the first direction. As the element 100b slides along the elongated cylindrical member 300 in the first direction, the edge portions 318 of the petals 312 slide along the outer surface 320 of the elongated cylindrical member 300.

When the element 100b moves along the elongated cylindrical member 300 in the first direction, the petals 312 trail the body portion 302 and are essentially dragged behind the body portion 302. This causes the petals 312 to deflect away from the outer surface 320, which allows the element 100b to slide along the elongated cylindrical member 300 in the first direction.

When a force acting on the element 100b urges the element in a direction opposite the first direction, the petals 312 lead the body portion 302 and are essentially pushed along the elongated cylindrical member 300 by the body portion 302. This causes the petals 312 to deflect towards the outer surface 320, which causes the edge portions 318 of the petals to deform and dig into the outer surface, which helps to block movement of the element 100b in the direction opposite the first direction.

As the force urging the element 100b in the direction opposite the first direction increases, the degree to which the petals 312 are urged towards the outer surface 320 increases. This increases the degree to which the edge portions 318 deform and dig into the outer surface 320 to block movement of the element 100b in the direction opposite the first direction.

Those skilled in the art will recognize that, because the petals 312 cause material deformation of the outer surface 320, the materials selected to construct the elongated cylindrical member 300 and the element 100b may affect the operation of the anchor device 68b. For example, the elongated cylindrical member 300 may comprise a metal rod, in which case the element 100b would be constructed of a metal or other material having a hardness greater than that of the metal rod. The metal rod could also include ribs or threads, extending radially around the rod, that would engage the edge portions 318 of the petals 312 to block movement of the element 100b in the direction opposite the first direction. As an alternative construction, the elongated cylindrical member 300 may comprise a plastic rod or a metal rod with an elastomeric coating, which would increase the ability of the petals 312 to cause material deformation in the outer surface 320 to block movement of the element 100b. As a further alternative, the elongated cylindrical member 300 may also comprise a metal cable that may or may not have an elastomeric coating.

As the element 100b (FIG. 13) slides downward in the first direction along the elongated cylindrical member 300, it is blocked from moving in the direction opposite the first direction at the farthest position from the first end 72b that the element reaches. When the inflatable curtain 14b is in the inflated condition, the element 100b and the elongated cylindrical member 300 help maintain the position of the curtain between any occupant of the vehicle 12b and the side structure 16b of the vehicle throughout the duration of the vehicle collision and/or rollover. The element 100b and the elongated cylindrical member 300 also help limit movement of the inflatable curtain 14b in a direction opposite the first direction.

The construction of the anchor device 68b in the embodiment illustrated in FIGS. 11–14 also is not dependent on the side of the vehicle on which the device is mounted. The anchor device 68b may be mounted on either side of a vehicle 12b, and the element 100b may be rotated about the cylindrical member 300 such that the flange portion 304 extends in a desired direction.

From the above description of the invention, those skilled in the art will perceive improvements, changes and modifications. For example, in the illustrated embodiments, the anchor device is connected to the vehicle on a C pillar of the vehicle. It will be recognized by those skilled in the art, however, that the anchor device may be connected on or near the A pillar or the B pillar, or at any other desired location on the vehicle. Such improvements, changes and modifications within the skill of the art are intended to be covered by the appended claims.

Having described the invention, the following is claimed:

1. Apparatus for helping to protect an occupant of a vehicle that has a roof and a side structure, said apparatus comprising:

an inflatable vehicle occupant protection device that is inflatable in a first direction away from the vehicle roof into a position between the side structure of the vehicle and a vehicle occupant;

an inflation fluid source for providing inflation fluid for inflating said inflatable vehicle occupant protection device;

an elongated member connected to the vehicle side structure and having a first end and an opposite second end, said elongated member having a length measured between said first and second ends; and an element connected to said inflatable vehicle occupant protection device, said element at least partially encircling said elongated member along a portion of the length of said elongated member, said element being slidable along said elongated member in said first direction along the length of said elongated member when said inflatable vehicle occupant protection device is inflated, said element including at least one portion that engages said elongated member and blocks said element from sliding along said elongated member in a direction opposite said first direction, said elongated member comprising a bar having a first surface and an opposite second surface;

said element comprising a housing and a latch that extends through said housing, said latch having an aperture that extends through said latch, said aperture being disposed in said housing;

said bar extending through said housing and through said aperture, said latch including edges that help define said aperture, said edges engaging said first and second surfaces of said bar to block said element from sliding along said bar in a direction opposite said first direction.

2. Apparatus as defined in claim 1, wherein said housing has an interior partially defined by a first side wall, an opposite second side wall and first and second end walls extending between said first and second side walls, said latch extending through openings in said first and second side walls and through said interior, said aperture being disposed in said interior, said bar extending transverse to said latch through openings in said first and second end walls, said bar extending through said interior and through said aperture.

3. Apparatus as defined in claim 1, wherein said element further comprises a spring disposed in said housing that biases said latch against said bar.

4. Apparatus as defined in claim 1, wherein said first surface of said bar includes a plurality of teeth, said latch engaging said teeth to block movement of said element in a direction opposite said first direction.

5. Apparatus as defined in claim 1, wherein said inflatable vehicle occupant protection device is an inflatable curtain having a stored position extending along the side structure adjacent the roof of the vehicle, said inflatable curtain being inflated in said first direction away from the vehicle roof and along the side structure of the vehicle.

6. Apparatus as defined in claim 5, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

7. Apparatus as defined in claim 5, wherein said inflatable curtain moves said element in said first direction as said inflatable curtain is inflated.

8. Apparatus as defined in claim 5, wherein said element helps to maintain the position of said inflatable curtain when said inflatable curtain is inflated.

9. Apparatus as defined in claim 5, wherein said inflatable curtain when inflated has a top edge positioned adjacent to the vehicle roof and an opposite bottom edge, said element being connected to said inflatable curtain at a position adjacent to said bottom edge.

10. Apparatus as defined in claim 5, wherein a tether connects said element to said inflatable curtain.

11. Apparatus as defined in claim 5, further including a sensor for sensing a predetermined vehicle condition and providing a signal in response to said predetermined vehicle condition that causes said inflation fluid source to provide said inflation fluid to inflate said inflatable curtain.

12. Apparatus as defined in claim 11, wherein said predetermined vehicle condition is one of a side impact and a vehicle rollover.

13. Apparatus as defined in claim 1, wherein said elongated member is connected to a pillar of the vehicle.

14. Apparatus as defined in claim 13, wherein said pillar is a C pillar of the vehicle.

15. Apparatus for helping to protect an occupant of a vehicle that has a roof and a side structure, said apparatus comprising:
   an inflatable vehicle occupant protection device that is inflatable in a first direction away from the vehicle roof into a position between the side structure of the vehicle and a vehicle occupant;
   an inflation fluid source for providing inflation fluid for inflating said inflatable vehicle occupant protection device;
   an elongated member connected to the vehicle side structure and having a first end and an opposite second end, said elongated member having a length measured between said first and second ends; and
   an element connected to said inflatable vehicle occupant protection device, said element at least partially encircling said elongated member along a portion of the length of said elongated member, said element being slidable along said elongated member in said first direction along the length of said elongated member when said inflatable vehicle occupant protection device is inflated, said element including at least one portion that engages said elongated member and blocks said element from sliding along said elongated member in a direction opposite said first direction, said element further including a spring for biasing said at least one portion of said element into engagement with said elongated member.

16. Apparatus as defined in claim 15 wherein said element includes a housing and a latch, said spring biasing said latch against said elongated member.

17. Apparatus as defined in claim 15 wherein said element includes a housing, said spring being disposed in said housing.

18. Apparatus as defined in claim 15 wherein said element includes a housing and a latch, said spring having a first portion for engaging said housing, a second portion for engaging said latch, and a third coiled portion for pivotally biasing said latch into engagement with said elongated member.

* * * * *